United States Patent
Moon et al.

(10) Patent No.: US 7,738,414 B2
(45) Date of Patent: Jun. 15, 2010

(54) MOBILE COMMUNICATION SYSTEM AND CONTROL DEVICE

(75) Inventors: Sung Uk Moon, Yokosuka (JP);
Takehiro Nakamura, Yokosuka (JP);
Minami Ishii, Yokohama (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 756 days.

(21) Appl. No.: 10/584,198

(22) PCT Filed: Dec. 24, 2004

(86) PCT No.: PCT/JP2004/019421

§ 371 (c)(1),
(2), (4) Date: Mar. 9, 2007

(87) PCT Pub. No.: WO2005/062651

PCT Pub. Date: Jul. 7, 2005

(65) Prior Publication Data
US 2008/0247347 A1     Oct. 9, 2008

(30) Foreign Application Priority Data

Dec. 24, 2003  (JP) .............................. 2003-428373
Dec. 22, 2004  (JP) .............................. 2004-372183

(51) Int. Cl.
*H04B 7/212* (2006.01)
*H04H 20/71* (2008.01)
(52) U.S. Cl. ....................................... 370/324; 370/312
(58) Field of Classification Search ................ 370/312, 370/324
See application file for complete search history.

(56) References Cited

U.S. PATENT DOCUMENTS

2003/0119452 A1*   6/2003  Kim et al. ............... 455/69

FOREIGN PATENT DOCUMENTS

| CN | 1247437 A    | 3/2000  |
|----|--------------|---------|
| JP | 2 26135      | 1/1990  |
| JP | 10 108248    | 4/1998  |
| JP | 2003 348643  | 12/2003 |
| JP | 2004 260620  | 9/2004  |
| KR | 2003-0084516 | 11/2003 |

OTHER PUBLICATIONS

"$3^{RD}$ Generation Partnership Project: Technical Specification Group Radio Access Network; Synchronisation in Utran Stage 2 (Release 5)", 3GPP TS 25.402 V5.1.0, pp. 1-46, 2002.

* cited by examiner

*Primary Examiner*—Vincent P Harper
*Assistant Examiner*—Timothy Pham
(74) *Attorney, Agent, or Firm*—Oblon, Spivak, McClelland, Maier & Neustadt, L.L.P.

(57) ABSTRACT

The present invention can improve a reception quality of mobile stations and utilize radio resources effectively, by resolving the problem caused when the conventional multicast communications system. The present invention relates to a radio communications system for transmitting same data to a plurality of cells via at least one base station and performing a soft combining or a selective combining on the same data received by a mobile station. The radio communications system includes a controlling unit configured to set up a cycle at which synchronization processing on transmission timing of the same data among the plurality of cells is performed, or an accuracy by which the synchronization processing is performed, for each control apparatus which performs the synchronization processing.

2 Claims, 6 Drawing Sheets

FIG. 4

| CORE NETWORK NODE | 1 (00) | | | | | | | |
|---|---|---|---|---|---|---|---|---|
| RADIO NETWORK CONTROLLER | 10 (00) | | | | 20 (01) | | | |
| BASE STATION | 11 (00) | | 12 (01) | | 21 (00) | | 22 (01) | |
| CELL | A (00) | B (01) | C (00) | D (01) | E (00) | F (01) | G (00) | H (01) |
| ID | 00000000 | 00000001 | 00000100 | 00000101 | 00010000 | 00010001 | 00010100 | 00010101 |

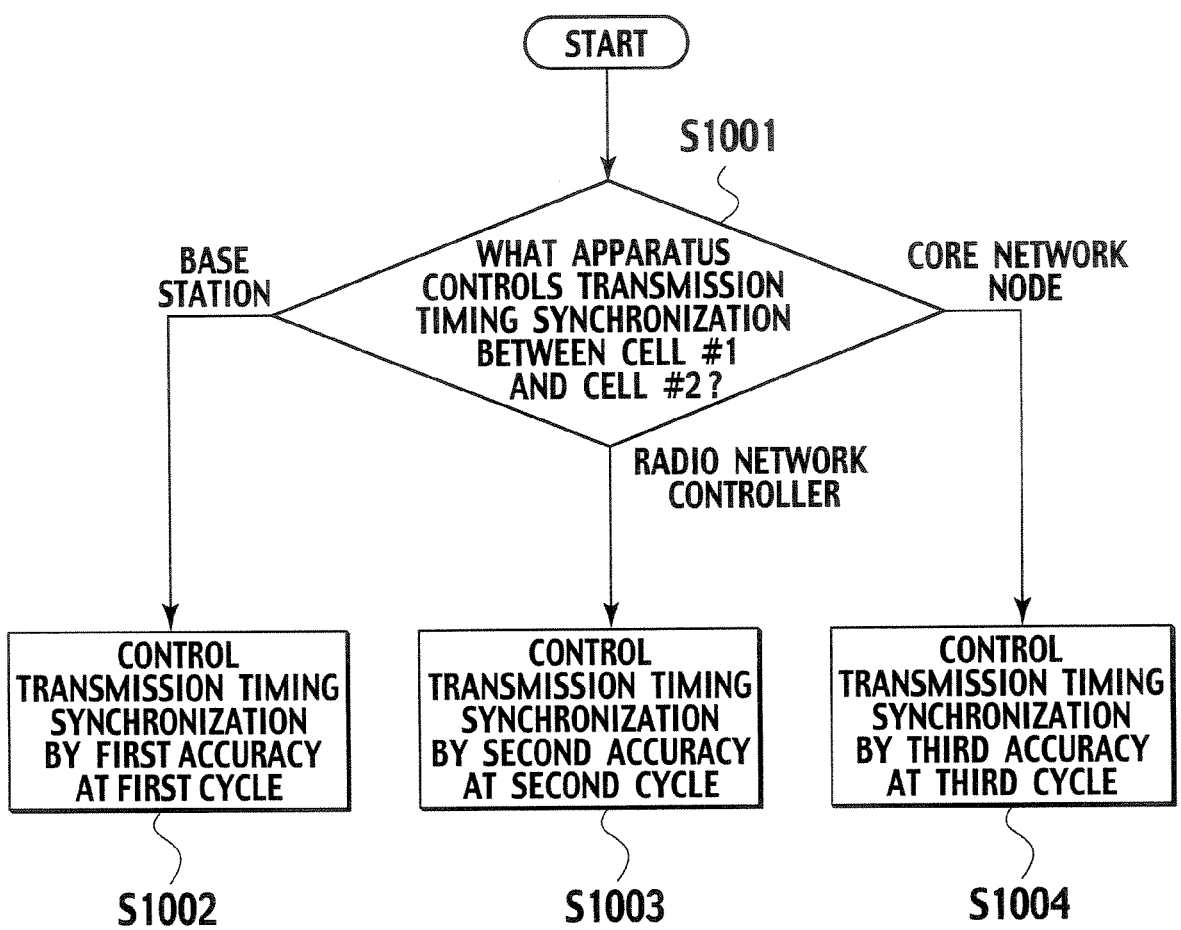

US 7,738,414 B2

MOBILE COMMUNICATION SYSTEM AND CONTROL DEVICE

TECHNICAL FIELD

The present invention relates to a radio communications system (a multicast communications system) for transmitting same data to a plurality of cells via one or a plurality of base stations, and performing a soft combining or a selective combining on same data received by a mobile station, and a control apparatus.

BACKGROUND ART

In a conventional radio communications system, a "UL/DL Node Synchronization" function is known as a technique for measuring a transmission delay between a radio network controller and a base station (an uplink transmission delay and downlink transmission delay).

Referring to FIG. 1, the "UL/DL Node Synchronization" function will be explained.

First, as shown in FIG. 1, the radio network controller transmits a DL node synchronization signal to the base station which manages each cell at a transmission time T1, when the base station starts or restarts. Here, the DL node synchronization signal includes information of the above mentioned transmission time T1.

Second, the base station receives the DL node synchronization signal at a reception time T2. In the other words, the DL node synchronization signal transmitted from the radio network controller reaches the base station with a transmission delay (T2−T1).

Third, the base station transmits an UL node synchronization signal including information showing the reception time T2 and a transmission time T3, to the radio network controller at the transmission time T3.

Fourth, the radio network controller measures a transmission delay between the radio network controller and the base station (an uplink transmission delay and downlink transmission delay) in accordance with the times T1, T2, T3 and T4.

Note that the radio network controller and the base station are configured to repeat the above processing at a fixed cycle, in the "UL/DL Node Synchronization" function of the conventional radio communications system.

Generally, in the multicast communications system, whether or not the mobile station can perform the soft combining or the selective combining depends on a transmission timing difference of same data among a plurality of cells.

However, in the conventional radio communications system, the radio network controller is only configured to control the transmission timing, by measuring the transmission delay between the radio network controller and the base station. Therefore, a problem often arises where the mobile station cannot perform the soft combining or the selective combining, since the transmission timing difference of the same data among the plurality of cells increases during the above multicast communications.

(Non-Patent literature 1) 3GPP TS25.402 v5.1.0 Synchronization in UTRAN Stage 2 2002.6

In viewing of the foregoing, it is an object of the present invention to provide a radio communications system and a control apparatus which can improve a reception quality of mobile stations and utilize radio resources effectively, by resolving the problem caused when the conventional radio communications system performs multicast communications.

DISCLOSURE OF INVENTION

A first aspect of the present invention is summarized as a radio communications system for transmitting same data to a plurality of cells via at least one base station, and performing a soft combining or a selective combining for the same data received by a mobile station. The radio communications system includes a transmission timing synchronization controlling unit configured to set up a cycle at which synchronization processing on transmission timing of the same data among the plurality of cells is performed, or an accuracy by which the synchronization processing is performed, for each control apparatus which performs the synchronization processing.

The invention can adjust a transmission timing difference among a plurality of cells, improve a reception quality of mobile stations and utilize radio resources effectively, by setting up the cycle at which the synchronization processing is performed, or the accuracy by which the synchronization processing is performed, for each control apparatus which performs the synchronization processing.

In the first aspect, the radio communications system can further include a cell information managing unit configured to manage a base station, a radio network controller and a core network node which manages each of the plurality of cells. The transmission timing synchronization controlling unit of a base station can be configured to perform the synchronization processing by a first accuracy at a first cycle, when all of the plurality of cells is managed by the base station. The transmission timing synchronization controlling unit of a radio network controller can be configured to perform the synchronization processing by a second accuracy at a second cycle, when all of the plurality of cells is managed by the radio network controller.

A second aspect of the present invention is summarized as a control apparatus used in a radio communications system for transmitting same data to a plurality of cells via at least one base station, and performing a soft combining or a selective combining on the same data received by a mobile station. The control apparatus includes a transmission timing synchronization controlling unit configured to set up a cycle at which synchronization processing on transmission timing of the same data among the plurality of cells is performed, or an accuracy by which the synchronization processing is performed, for each control apparatus which performs the synchronization processing.

In the second aspect, the control apparatus can further include a cell information managing unit configured to manage a base station, a radio network controller and a core network node which manages each of the plurality of cells. The transmission timing synchronization controlling unit of the control apparatus of a base station can be configured to perform the synchronization processing by a first accuracy at a first cycle, when all of the plurality of cells is managed by the base station; and the transmission timing synchronization controlling unit of the control apparatus of a radio network controller can be configured to perform the synchronization processing by a second accuracy at a second cycle, when all of the plurality of cells is managed by the radio network controller.

BRIEF DESCRIPTION OF THE DRAWING

FIG. 4 is a diagram showing an example of contents managed by a cell information managing unit of the control apparatus according to the embodiment of the present invention; and FIG. 5 is a flow chart showing an operation of the radio communications system according to the embodiment of the present invention.

BEST MODE FOR CARRYING OUT THE INVENTION

<A Configuration of a Radio Communications System According to One Embodiment of the Present Invention>

Figure 2:
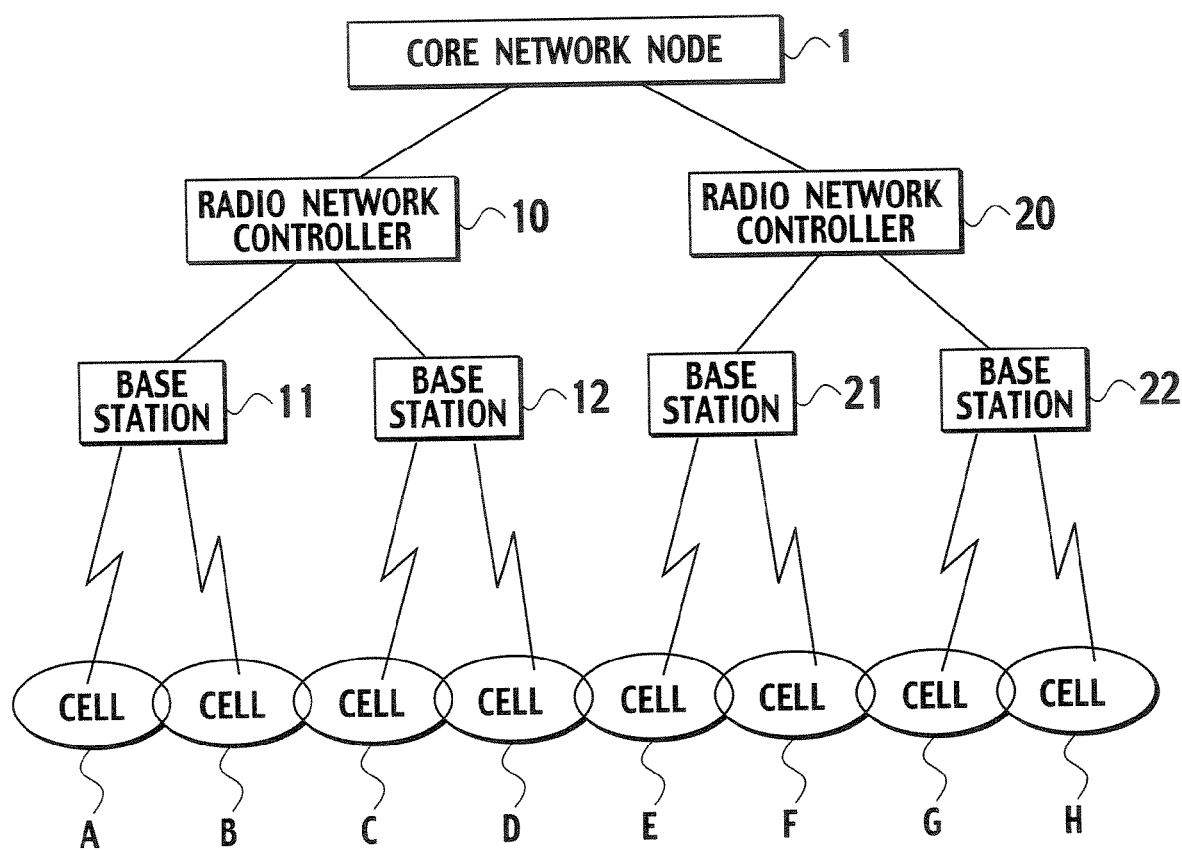
FIG. 2 is a diagram showing an entire configuration of a radio communications system according to one embodiment of the present invention.
Figure 3:
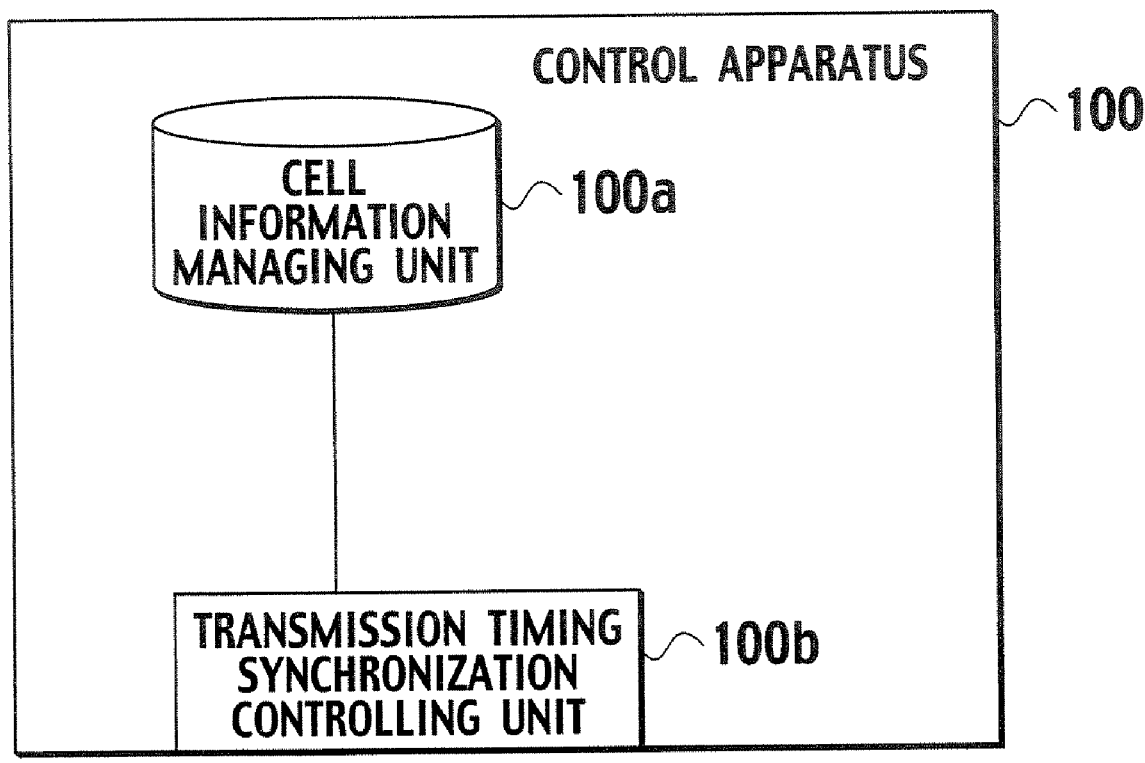
FIG. 3 is a functional block diagram of a control apparatus of (a core network node, a radio network controller, or a base station) according to the embodiment of the present invention.

Referring to FIGS. 2 to 4, a configuration of a radio communications system according to one embodiment of the present invention will be described. FIG. 2 is a diagram showing an entire configuration of the radio communications system according to this embodiment.

The radio communications system according to this embodiment is a multicast communications system for transmitting same data to a plurality of cells via one or a plurality of base stations, and performing a soft combining or a selective combining on the same data received by a mobile station.

As shown in FIG. 2, the radio communications system according to this embodiment includes a core network node 1, a plurality of radio network controllers 10 and 20, and a plurality of base stations 11, 12, 21 and 22. Here, cells "A" to "D" are managed by the upper control apparatuses (a core network node, a radio network controller and a base station), respectively. For example, the core network node corresponds to an exchange apparatus SGSN (Serving GPRS Support Node).

For example, cells "A" and "B" are managed by the core network node 1, the radio network controller 10 and the base station 11. Cells "C" and "D" are managed by the core network node 1, the radio network controller 10 and the base station 12. In other words, the core network node and the radio network controller which manage the cells "A" and "B" is same as the core network node and the radio network controller which manage the cells "C" and "D". However, the base station which manages the cells "A" and "B" is different from the base station which manages the cells "C" and "D".

Similarly, cells "E" and "F" are managed by the core network node 1, the radio network controller 20 and the base station 21. Therefore, the core network node which manages the cells "E" and "F" is same as the core network node which manages the cells "A" to "D". However, the radio network controller and the base station which manage the cells "E" and "F" are different from the radio network controller and the base station which manage the cells "A" to "D".

Here, a transmission timing synchronization processing on same data among a plurality of cells is performed by a control apparatus which manages all of the plurality of cells.

For example, the transmission timing synchronization processing on same data between the cell "A" and the cell "B" is performed by the base station 11, the radio network controller 10 or the core network node 1. The transmission timing synchronization processing on same data between the cell "B" and the cell "C" is performed by the radio network controller 10 or the core network node 1. The transmission timing synchronization processing on same data between the cell "D" and the cell "F" is performed by the core network node 1.

Therefore, in the transmission timing synchronization processing on same data between the cell "A" and the cell "B" which is managed by the same base station 11, there is a lower possibility that loss of the transmission timing synchronization occurs and the accuracy of the transmission timing synchronization processing is higher, in comparison with the transmission timing synchronization processing on same data between the cell "B" and the cell "C" which is managed by different base stations.

FIG. 3 is a functional block diagram of a control apparatus (the core network node, the radio network controller or the base station) 100 according to this embodiment. As shown in FIG. 3, the control apparatus 100 according to this embodiment includes a cell information managing unit 100a and a transmission timing synchronization controlling unit 100b.

The cell information managing unit 100a is configured to manage a base station, a radio network controller and a core network node which manage each of a plurality of cells.

To be more specific, as shown in FIG. 4, the cell information managing unit 100a is configured to manage a "cell", a "base station", a "radio network controller", a "core network node" and an "identifier" in association with each other.

Here, the "identifier" shows a route of the same data. For example, the "identifier=00000000" shows a route which transmits the same data to the cell "A" via the core network node 1, the radio network controller 10 and the base station 11. In the "identifier", the first and second bits indicate the core network node 1 (00), the third and fourth bits indicate the radio network controller 10 (00), the fifth and sixth bits indicate the base station 11 (00), and the seventh and eighth bits indicate the cell "A" (00).

The transmission timing synchronization controlling unit 100b is configured to set up a cycle at which a transmission timing synchronization processing on the same data among the plurality of cells is performed, or an accuracy by which the transmission timing synchronization processing is performed, for each control apparatus (the core network node, the radio network controller or the base station) which performs the transmission timing synchronization processing. For example, the transmission timing synchronization controlling unit 100b can set up a different cycle at which the transmission timing synchronization processing, or a different accuracy by which the transmission timing synchronization processing is performed, for each control apparatus (the core network node, the radio network controller or the base station) which performs the transmission timing synchronization processing.

<An Operation of the Radio Communications System According to the Embodiment>

Referring to FIG. 5, an operation for performing a transmission timing synchronization processing on the same data among a plurality of cells in the radio communications system according to this embodiment will be described.

As shown in FIG. 5, in step S1001, the radio communications system according to this embodiment determines a control apparatus which performs the transmission timing synchronization processing on the same data between cell #1 and cell #2, by referring to the cell information managing unit 100*a* of each control apparatus 100.

Figure 6A:
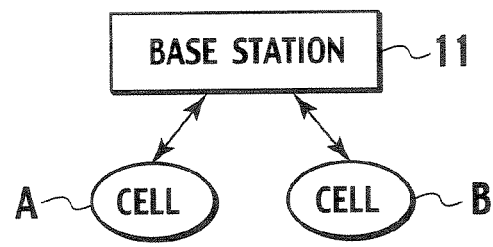
FIG. 6A is a diagram for explaining a transmission timing synchronization control processing in the radio communications system according to the embodiment of the present invention.

For example, in step S1002, as shown in FIG. 6A, the transmission timing synchronization controlling unit 100*b* of the base station 11 performs the transmission timing synchronization processing on the same data between cell #1 and cell #2 by a first accuracy at a first cycle, when the cell #1 is the cell "A" and the cell #2 is the cell "B".

Figure 1:
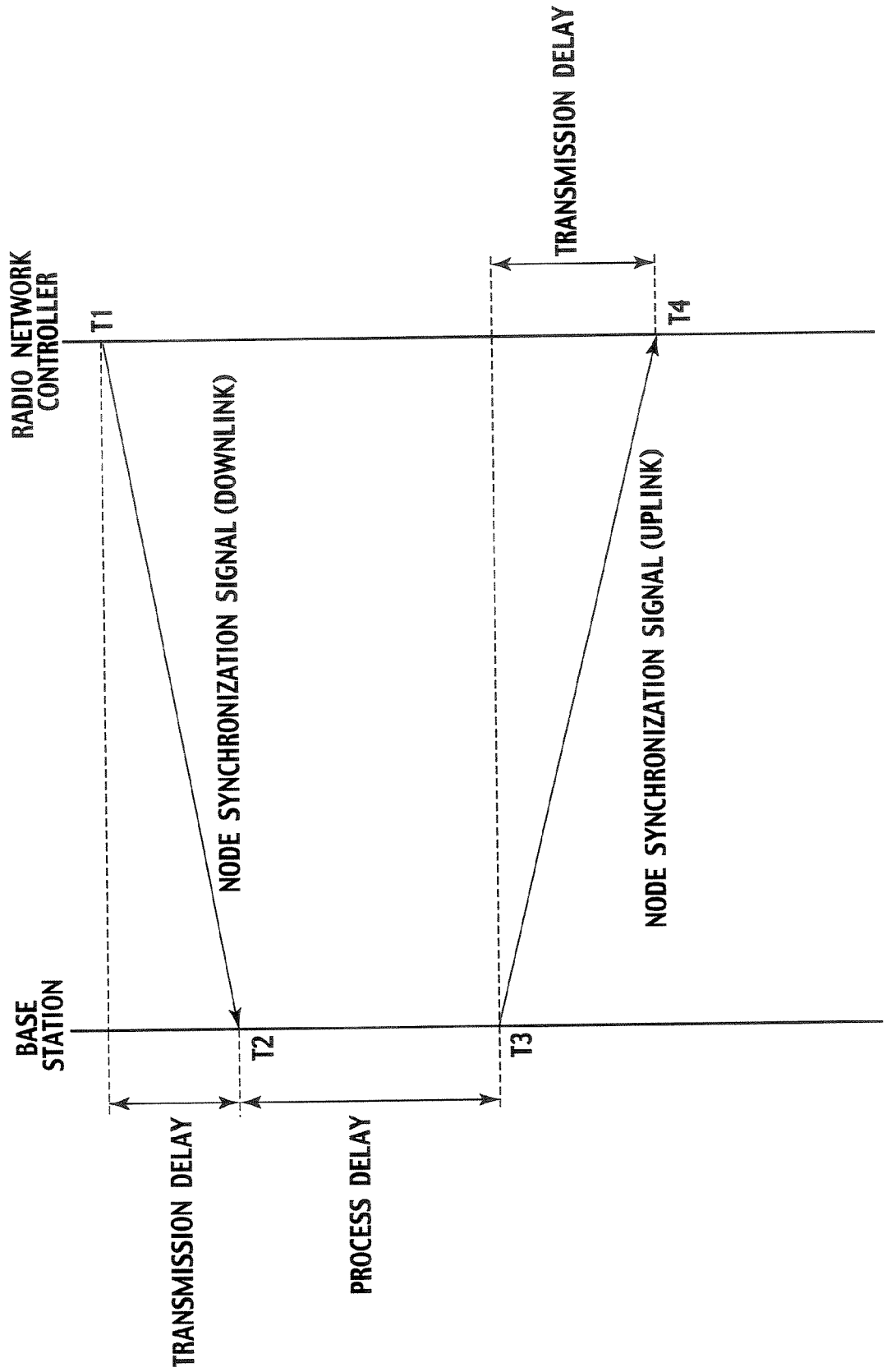
FIG. 1 is a diagram for explaining the "UL/DL synchronization" function according to a prior art.

To be more specific, the transmission timing synchronization controlling unit 100*b* of the base station 11 performs the above transmission timing synchronization processing at a comparative long cycle (for example, at a cycle of 10 minutes with an error of less than 50 ms). In other words, the transmission timing synchronization controlling unit 100*b* of the base station 11 measures a transmission delay time of a downlink between the base station 11 and the cell "A" and a transmission delay time of a downlink between the base station 11 and the cell "B" by using the "UL/DL Node Synchronization" function as shown in FIG. 1, and determines a transmission timing for the cell "A" and a transmission timing for the cell "B".

Figure 7:
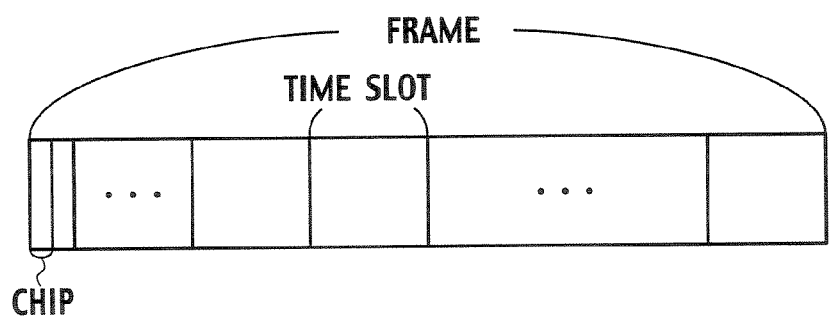
FIG. 7 is a diagram for explaining a transmission timing synchronization control processing in the radio communications system according to the embodiment of the present invention.

The transmission timing synchronization controlling unit 100*b* of the base station 11 performs the above transmission timing synchronization processing by an accuracy for enabling the mobile stations to perform the soft combining on the same data (for example, an accuracy for falling a time difference between received information within 80 ms (348000*8 chips)). For example, as shown in FIG. 7, the transmission timing synchronization controlling unit 100*b* of the base station 11 is configured to determine the above transmission timing by a chip basis.

Figure 6B:
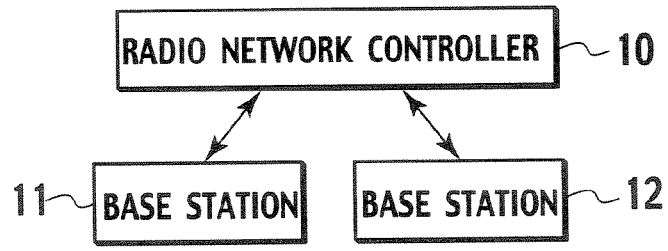
FIG. 6B is a diagram for explaining a transmission timing synchronization control processing in the radio communications system according to the embodiment of the present invention.

On the other hand, in step S1003, as shown in FIG. 6B, the transmission timing synchronization controlling unit 100*b* of the radio network controller 10 performs the transmission timing synchronization processing on the same data between cell #1 and cell #2 by a second accuracy at a second cycle, when the cell #1 is the cell "B" and the cell #2 is the cell "C".

To be more specific, the transmission timing synchronization controlling unit 100*b* of the radio network controller 10 performs the above transmission timing synchronization processing at a cycle shorter than the first cycle (for example, at a cycle of 1 minutes with an error of less than 10 ms). In other words, the transmission timing synchronization controlling unit 100*b* of the radio network controller 10 measures a transmission delay time of a downlink between the radio network controller 10 and the base station 11 and a transmission delay time of a downlink between the radio network controller 10 and the base station 12 by using the "UL/DL Node Synchronization" function as shown in FIG. 1, and determines a transmission timing for the base station 11 and a transmission timing for the base station 12.

The transmission timing synchronization controlling unit 100*b* of the radio network controller 10 performs the above transmission timing synchronization processing by an accuracy for enabling the mobile stations to perform the selective combining on the same data (for example, an accuracy for falling a time difference between received information within 80 ms (348000*8 chips)). For example, as shown in FIG. 7, the transmission timing synchronization controlling unit 100*b* of the radio network controller 10 is configured to determine the above transmission timing by a time slot basis.

Figure 6C:
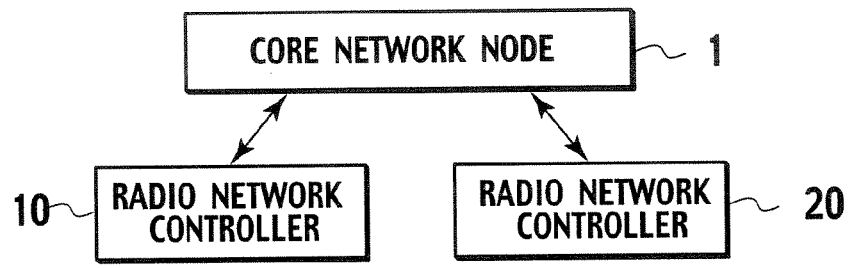
FIG. 6C is a diagram for explaining a transmission timing synchronization control processing in the radio communications system according to the embodiment of the present invention.

And, in step S1004, as shown in FIG. 6C, the transmission timing synchronization controlling unit 100*b* of the core network node 1 performs the transmission timing synchronization processing on the same data between cell #1 and cell #2 by a third accuracy at a third cycle, when the cell #1 is the cell "D" and the cell #2 is the cell "E".

To be more specific, the transmission timing synchronization controlling unit 100*b* of the core network node 1 can perform the above transmission timing synchronization processing at a cycle shorter than the second cycle. In other words, the transmission timing synchronization controlling unit 100*b* of the core network node 1 measures a transmission delay time of a downlink between the core network node 1 and the radio network controller 10 and a transmission delay time of a downlink between the core network node 1 and the radio network controller 20 by using the "UL/DL Node Synchronization" function as shown in FIG. 1, and determines a transmission timing for the radio network controller 10 and a transmission timing for the radio network controller 20.

For example, as shown in FIG. 6. the transmission timing synchronization controlling unit 100*b* of the base station 11 is configured to determine the above transmission timing by a frame basis.

Since it is difficult to perform the above transmission timing synchronization processing by the accuracy for enabling the mobile stations to perform the soft combining or the selective combining on the same data when the same data is transmitted via different radio network controllers to the cells concerned, the core network node 1 can be configured not to perform the above transmission timing synchronization processing.

For example, the same data is transmitted to the cell "A", the cell "B", the cell "D" and the cell "E", the core network node 1 is configured to perform the transmission timing synchronization processing between each of the cell "A", "B", "D" and the cell "E", the radio network controller 10 is configured to perform the transmission timing synchronization processing between each of the cell "A", "B" and the cell "D", the base station 10 is configured to perform the transmission timing synchronization processing between the cell "A" and the cell "B".

<Functions and Effects of the Radio Communications System According to the Embodiment>

The radio communications system according to this embodiment can solve the problem caused by the conventional radio communications system, so as to improve a reception quality of each mobile station, and to utilize radio resources effectively.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

INDUSTRIAL APPLICABILITY

The present invention can provide a radio communications system and a control apparatus which can improve a reception quality of mobile stations and utilize radio resources effectively, by resolving the problem caused when the conventional radio communications system performs multicast communications.

The invention claimed is:

1. A radio communications system for transmitting same data from an upper node to a plurality of cells via a plurality of base stations, and performing a soft combining or a selective combining on the same data received by a mobile station, the radio communications system comprising:
   an upper node synchronization controlling unit, at the upper node, configured to control synchronization processing on transmission timing of the same data among the plurality base stations based on a transmission delay time of a downlink between the upper node and the plurality of base stations; and
   a base station synchronization controlling unit, at each of the plurality of base stations, configured to control synchronization processing on transmission timing of the same data among the plurality of base stations based on a transmission delay time of a downlink between each of the plurality of cells, wherein
   the upper node synchronization controlling unit is configured to control the synchronization processing on transmission timing by a second accuracy,
   the base station synchronization controlling unit is configured to control the synchronization processing on transmission timing by a first accuracy, and
   the first accuracy by which the synchronization processing on transmission timing is controlled is higher than the second accuracy by which the synchronization processing on transmission timing is controlled.

2. The radio communications system according to claim 1, wherein
   the upper node synchronization controlling unit is configured to control the synchronization processing on transmission timing by a second cycle,
   the base station synchronization controlling unit is configured to control the synchronization processing on transmission timing by a first cycle, and
   the first cycle is shorter than second cycle.

* * * * *